Nov. 14, 1950 L. W. COUILLARD 2,530,000

AUTOMATIC VOLUME CONTROL ARRANGEMENT

Filed Nov. 1, 1945

LUTHER W. COUILLARD
INVENTOR.

BY John J. Rogan
ATTORNEY

Patented Nov. 14, 1950

2,530,000

UNITED STATES PATENT OFFICE 2,530,000

AUTOMATIC VOLUME CONTROL ARRANGEMENT

Luther W. Couillard, Cedar Rapids, Iowa, assignor to Collins Radio Company, Cedar Rapids, Iowa, a corporation of Iowa Application November 1, 1945, Serial No. 626,145

6 Claims. (Cl. 250—20)

This invention relates to electric wave transmission systems and more especially to arrangements for automatically maintaining the output level of such systems uniform.

A principal object of the invention is to provide an improved automatic output volume control circuit arrangement for radio receivers and the like.

Another object is to provide an automatic output level regulating arrangement wherein the ratio of the level regulating voltage to level change is very high.

A feature of the invention relates to an automatic volume control arrangement employing a special regulator tube whose output voltage for A. V. C. purposes is a function of the level of the A. C. component of the modulated carrier wave input level, as well as a function of a level of the rectified carrier wave.

Another feature relates to an automatic volume control arrangement wherein the A. V. C. voltage is derived from a grid-controlled amplifier tube whose input electrodes are driven by a portion of the rectified carrier wave, and whose plate or anode is driven by the carrier wave before rectification.

A further feature relates to a cathode driven A. V. C. regulator tube which derives its plate potential from the carrier wave whose output level is to be regulated.

A further feature relates to an automatic volume control arrangement employing the combination of a diode rectifier detector, and a grid-controlled tube of the sharp plate current cut-off and high amplification factor, and with its control grid at D. C. ground potential.

A still further feature relates to the novel organization, arrangement and interconnection of parts which cooperate to provide an improved automatic volume control or output level control device.

Other features and advantages not specifically enumerated, will be apparent after a consideration of the following detailed descriptions and the appended claims.

Inasmuch as the invention is primarily concerned with the A. V. C. regulating arrangement of a wave signalling system, only those parts of a conventional radio receiver are illustrated so as to enable the inventive concept to be understood for purposes of practical use. Furthermore, while the invention is disclosed specifically in connection with a radio receiver, it will be understood that the fundamental features of the invention are equally well applicable to transmitters, repeaters, and the like.

Figure 1:
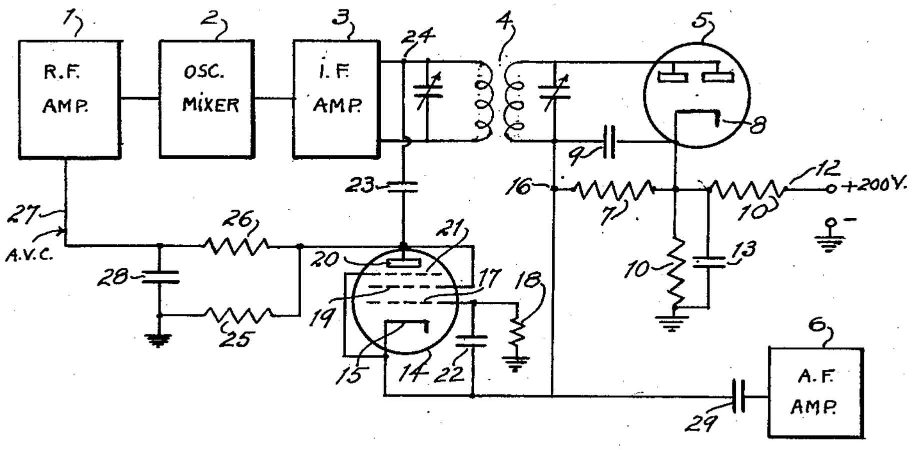
Fig. 1 is a schematic circuit diagram of a radio receiving system embodying the invention.

Referring to Fig. 1, there is shown a typical high frequency wave signalling arrangement in the form of a conventional radio receiver of the superheterodyne type. It will be understood however that the invention is not limited to a superheterodyne receiver but can also be applied to so-called tuned radio frequency receivers. The receiver shown in Fig. 1 comprises a radio frequency amplifier unit 1, an oscillator-mixer unit 2, an intermediate frequency amplifier unit 3, an intermediate frequency coupling transformer 4, a detector 5, and an audio frequency amplifier unit 6. If the receiver is of the type having more than one intermediate frequency stage, the transformer 4 may be that associated with the output of the last intermediate frequency stage which feeds the second detector 5. Detector 5 is preferably a vacuum tube rectifier of the type 12H6, the anodes of which are connected together and to one terminal of the secondary winding of transformer 4. This secondary winding, like the primary winding, is tuned to the desired carrier or intermediate frequency of the system. The secondary winding is returned through the rectifier load resistor 7 to the cathode 8 of the rectifier. Resistor 7 may be of approximately 300,000 ohms and is shunted by a condenser 9 of approximately 300 mmfd. for by-passing any high frequency or intermediate frequency currents. The cathode 8 is normally positively biassed with respect to ground by means of voltage divider resistors 10, 11. The terminal 12 of resistor 11 is connected to positive D. C. voltage of approximately 200 volts while one end of the resistor 10 is grounded. The cathode 8 is connected to the junction point of resistors 10 and 11. Resistor 10 may be of approximately 10,000 ohms, while the resistor 11 may be approximately 100,000 ohms. Under these circumstances, cathode 8 is normally positively biassed above ground to approximately 20 volts D. C. Resistor 10 is provided with a by-pass condenser 13 of approximately .01 mfd, so as to provide a path to ground for A. C. voltages.

Tube 14 is any well-known type of grid-controlled vacuum tube having a sharp plate current cutoff characteristic and with a high amplification factor, of which the type 12SJ7 is representative. Preferably tube 14 is of the triple grid type and has its cathode 15 driven under control of the D. C. potential variations at the point 16 and with its control grid 17 at D. C. ground potential through resistor 18 which may be approximately 220,000 ohms. The second grid 19 is connected directly to the anode 20, while the suppressor grid 21 is connected directly to the cathode 15. A condenser 22 of approximately .01 mfd. is connected directly across grid 17 and cathode 15, so as to maintain them at the same audio frequency potential.

Plate electrode 20 and grid 19 are supplied with operating voltage through the condenser 23 of approximately 100 mmfd. from the output terminal 24 of the intermediate frequency amplifier 3. The intermediate frequency potential which is obtainable at the primary of transformer 4 is approximately twice that obtainable at the secondary thereof. The plate 20 of tube 14 is D. C. returned through a resistor 25 of approximately 1 megohm. The D. C. voltages developed across resistor 25 are applied through resistor 26 of approximately 470,000 ohms to the A. V. C. conductor 27 which leads to the control grid bias circuit of the radio frequency amplifier tube in stage 1, so as to control the gain thereof in the usual A. V. C. manner. Any audio frequency components present in the D. C. voltages across resistor 25 are removed by the filter which is constituted of the resistor 26 and the condenser 28 of approximately .1 mfd.

The detected audio frequency signals from the intermediate frequency amplifier which appear at the point 16 are fed to the audio frequency amplifying unit 6 through the coupling condenser 29.

Under the above-described conditions, when no radio frequency signals are applied to amplifier 1, the point 16 is at positive 20 volts D. C. Since the grid 17 of tube 14 is at D. C. ground potential, and since the cathode 15 is at 20 volts D. C. positive potential, the tube 14 is blocked against plate-to-cathode current flow. When radio frequency carrier signals are received, and consequently when corresponding intermediate frequency carrier signals are present in transformer 4, point 16 becomes less positive, thus lowering the cutoff bias on the grid of tube 14. At same low value of positive voltage on the cathode 15 corresponding to the resultant rectified intermediate frequency carrier and the normal bias on cathode 8, the tube 14 becomes plate current conductive. Under these conditions the carrier voltage which is applied through condenser 23 to the plate 20 is rectified and develops a corresponding D. C. voltage across resistor 25. Since tube 14 has a high amplification factor, the change in condition from no plate current to full plate current can be effected with a change in potential of cathode 15 of the order of 1 volt D. C. When tube 14 is fully plate conductive, approximately 40 volts of automatic volume control potential are available over conductor 27. Thus it can be seen that if the rectified carrier signal at point 16 changes from an initial value of 20 volts to a value of 21 volts, the automatic volume control voltage which is available will be 40 volts D. C.

Figure 2:
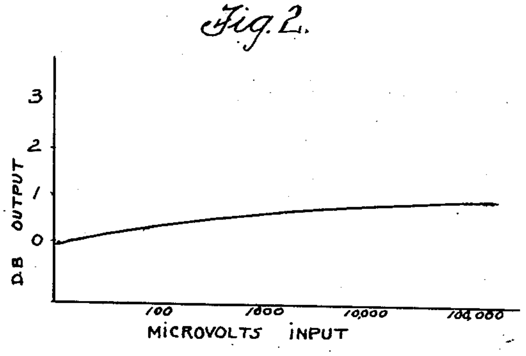
Fig. 2 is a graph showing the relation between input carrier voltage and output signal level of the system of Fig. 1.

It will also be seen that since the change from no conductivity to full conductivity of tube 14 is controlled both by the undetected carrier applied to plate 20 and by the resultant detected signal applied to cathode 15, the resultant automatic volume control voltage is much greater than that obtainable from the rectified carrier voltage alone. In the conventional A. V. C. control circuit, reliance is placed upon the rectified carrier voltage to derive the A. V. C. voltage. Consequently, the resultant A. V. C. voltage is less than that obtainable in the present system, because in the usual A. V. C. circuit there is a considerable voltage loss between the secondary and primary of the intermediate frequency transformer. In the arrangement shown in Fig. 1 approximately twice the intermediate frequency voltage is available when the tube 14 is connected to the primary of the last intermediate frequency transformer 4. Under the values above mentioned, the 40 volts of automatic volume control voltage decreases the gain of the radio frequency amplifier 1, so that the output of the system changes only a very small amount notwithstanding a large increase in modulated carrier signal input to the amplifier 1. An examination of the graph of Fig. 2 shows that with an arrangement such as shown in Fig. 1 it is possible to maintain the output level of the radio receiver in decibels within comparatively narrow limits over a very wide range of microvolts input to the amplifier 1.

While one particular embodiment has been disclosed in Fig. 1, it will be understood that various changes and modifications may be made therein without departing from the spirit and scope of the invention.

What is claimed is:

1. A volume control arrangement for carrier wave receiving systems, comprising a carrier wave amplifier, a carrier wave rectifier having circuit connections to said amplifier for continuously rectifying both weak and strong carriers, a load circuit connected to said rectifier to develop therein demodulated audio frequency signal voltages, a single gain control amplifier tube of the grid-controlled type, means to apply the carrier before rectification to the plate of said gain control amplifier tube so that the operating plate potential thereof is derived solely from said carrier, circuit means connecting said load circuit to the input of said gain control amplifier tube to correspondingly vary the plate current of said tube for both weak and strong carriers, a separate load circuit for said gain control amplifier tube for developing direct current voltages proportionate both to the level of the carrier before rectification and to the amplitudes of the demodulated signals from said rectifier, and means for applying said direct current voltages to a gain control element of said carrier wave amplifier.

2. A volume control arrangement according to claim 1, in which the carrier wave amplifier is coupled to said rectifier through a transformer, and circuit connections are provided between the primary of said transformer and the plate of said gain control amplifier tube for supplying said gain control tube with its operating plate voltage, said rectifier having its load circuit in the form of a resistance which is connected to the cathode of said gain control tube to drive said cathode positively with respect to its control grids.

3. A volume control arrangement for carrier wave receiving systems, comprising a carrier wave amplifier stage, a signal detector coupled to the output of said stage, a load circuit for said detector for developing audio frequency signal demodulations, a single gain control amplifier tube of the grid-controlled type, circuit connections between the said load circuit and the cathode of said gain control amplifier tube for varying the cathode potential of said tube with respect to its control grid in accordance with the said demodulations, and other circuit connections between the output of said carrier wave amplifier stage and the plate of said gain control amplifier tube whereby said plate receives its operating voltage solely from said stage prior to rectification by said detector, and means for applying the rectified plate current of said gain control amplifier tube to control the gain of said amplifier stage.

4. A volume control arrangement according to claim 3, in which said detector load circuit includes a load resistance, said gain control amplifier tube having a sharp plate current cut-off characteristic.

5. A volume control arrangement according to claim 3, in which the carrier wave amplifier is coupled to said detector through a transformer, said gain control amplifier tube having its plate electrode connected to the primary winding of said transformer and its cathode connected to the secondary winding of said transformer through said detector, and means for maintaining the control grid of said gain control amplifier tube substantially at direct current ground potential.

6. A volume control arrangement for carrier wave receiving systems, comprising means to derive a gain control voltage and including a single automatic gain control tube of the grid-controlled amplifier type having a single electron-emitting cathode, a single anode and at least one intervening grid, said means also including a carrier wave amplifier stage and a separate signal modulation detector having an audio frequency signal developing load circuit, circuit connections between said load circuit and said gain control amplifier tube for normally biasing said tube to plate current cut-off in the absence of received carrier signals and for biasing said tube to plate conduction for both strong and weak received carriers, circuit means for applying the output of the carrier wave amplifier stage to the plate of said gain control tube to control the plate current thereof, a load device connected to the plate of said gain control amplifier tube for developing direct current voltages in accordance with the rectified plate current of said tube, and circuit means for applying said direct current voltages to control the gain of said amplifier stage.

LUTHER W. COUILLARD.

REFERENCES CITED

The following references are of record in the file of this patent:

UNITED STATES PATENTS

| Number | Name | Date |
|---|---|---|
| 1,744,718 | De Bellescize | Jan. 21, 1930 |
| 1,890,454 | Bruce | Dec. 13, 1932 |
| 1,942,234 | Beers | Jan. 2, 1934 |
| 1,950,145 | Hentschel | Mar. 6, 1934 |
| 2,034,970 | Bond | Mar. 24, 1936 |
| 2,083,243 | Schade | June 8, 1937 |
| 2,135,949 | Roberts | Nov. 8, 1938 |
| 2,144,605 | Beers | Jan. 24, 1939 |
| 2,171,677 | Weagent | Sept. 5, 1939 |
| 2,173,248 | Braden | Sept. 19, 1939 |
| 2,222,759 | Burnside | Nov. 26, 1940 |
| 2,266,509 | Percival | Dec. 16, 1941 |
| 2,337,196 | Hollingsworth | Dec. 21, 1943 |

FOREIGN PATENTS

| Number | Country | Date |
|---|---|---|
| 442,506 | Germany | Apr. 12, 1927 |